Patented Sept. 27, 1938

2,131,433

UNITED STATES PATENT OFFICE 2,131,433

BAKING POWDER AND METHOD OF IMPROVING THE KEEPING QUALITIES OF THE SAME

Augustus H. Fiske, Warren, R. I., assignor to Rumford Chemical Works, Rumford, R. I., a corporation of Rhode Island No Drawing. Application August 31, 1937, Serial No. 162,172

11 Claims. (Cl. 99—95)

My present invention relates to improved mixtures of materials which eventually alone or when mixed with other substances, are intended to react chemically. As will be understood, difficulties exist both in ensuring proper reaction and in preventing premature reaction as a result of the combining characteristics of the several materials, which characteristics may be in part dependent on their physical state. Under certain conditions, too rapid or premature reaction takes place when both or all ingredients are in a pulverulent state, whereas, if all are in a granular state, the reaction may be too slow or incomplete. Reaction is of course more rapid in the pulverulent state, and in order to improve the keeping qualities of reactive mixtures, it has been the practice in certain industries to mix and pack the ingredients in granular instead of powdered form.

There have existed certain objections to this practice, principally in that it is more expensive to produce the materials in granular than in powdered condition, and also because in granular form one reactant may not react as quickly as another, one or both may not be wholly soluble, or one or both may leave a gritty residue.

This is true to a greater or less extent in the baking powder industry in which, since the Catlin invention as set forth in his Patent No. 474,811, it has been the practice to mix and pack the acid and alkaline reactants both in granular form. This produces a reasonably stable product which may be rated at 1000 in the discussion of my present invention.

Nevertheless such a leavening product, depending as it does upon gas forming reactants, has always been particularly susceptible to premature degenerative action of these elements upon each other when kept for any considerable length of time in a can or other container.

Baking powders are usually composed of an acid ingredient or compound and bicarbonate of soda as the other active ingredient. The two reactants are mixed with a body of corn starch as a diluent to standardize the strength of the preparation and to keep the reactive particles from too intimate contact.

My experiments have been made largely in connection with so called "calcium phosphate" baking powders, with which industry I am actively connected, but my discoveries will apply to any mixture of reactive materials in which it is desirable for any reason to provide certain of the ingredients in a granular state and others in a pulverulent state. So far as baking powders are concerned, it will be apparent that my invention relates to cream of tartar baking powders, alum phosphate, and other baking powders to the same extent that it applies to the calcium phosphate baking powders with which I have worked.

For economical and manufacturing reasons, there is decided advantage in providing the calcium phosphate in powdered rather than in granular form, and my immediate objective was to produce a baking powder including finely powdered calcium phosphate which would be commercially satisfactory and of good keeping quality. My experiments have indicated that, considering the standard commercial calcium phosphate baking powder as having a keeping quality of 1000, the keeping quality of a mixture of granular bicarbonate of soda, powdered calcium phosphate and the usual corn starch is only 276. This obviously is wholly unsatisfactory.

In my copending application, Ser. No. 161,751, filed Aug. 31, 1937, I have shown how it is possible to improve the keeping qualities of a standard baking powder by treating the active ingredients with an electrostatic charge. By my present experiments, I have proven that the treatment separately of the active ingredients with an electrostatic charge of like sign, before mixing, will give at reasonable production costs, an improved baking powder of enhanced keeping quality, in which the alkaline reactant is granular bicarbonate of soda and the acid reactant is finely divided calcium phosphate, which mixture, as above indicated, heretofore has been impractical and unsuccessful.

In carrying out my invention, I treat the granular bicarbonate of soda with an electrostatic charge, the charge being preferably of plus character. This may be done by suspending the ingredients in metal contact in a metal container at the positive (+) pole of an electrostatic machine, the terminals being at least ¼" apart and the Leyden jars, which are part of the usual equipment of such a machine, cut out. I treat the material for at least one minute with the full electrostatic charge. Other apparatus for the same purpose obviously may be substituted.

The monocalcium phosphate of fine pulverulent variety is separately electrostatically treated, to give it a charge of like sign as bicarbonate of soda.

I mix the electrostatically treated bicarbonate of soda with the inert ingredient, the starch, which need not be electrostatically treated. The treated phosphate is then mixed into the already mixed bicarbonate and starch. If preferred, the phosphate may first be mixed with the starch and the bicarbonate of soda added to that mixture.

All ingredients should be thoroughly dried before mixing, the carbonate for 16 hours at 130° F., the phosphate for 16 hours at 160° F., and the starch for 16 hours at 212° F.

The resulting baking powder will be found to have certainly as good and my experiments indicate an improved keeping quality than the standard baking powder in which the calcium phosphate is of the ordinary granular variety, with keeping qualities rated at 1000. From my experiments I have established that my electrostatically treated baking powder containing the pulverulent calcium phosphate has a keeping standard ratio of 1044 at the end of a year, where a mixture of the same ingredients without the electrostatic treatment had a keeping quality of only 276. It is evident therefore that my invention makes possible economy in the manufacture as well as improvement in the stability of the baking powder, and that in fact the mixture of granular and pulverulent ingredients ranks higher in keeping properties than the standard mixture of granular ingredients.

In my search for optimum results, I also made experiments with a considerable number of materials in an effort to find a chemical inhibitor of premature reaction between the bicarbonate of soda and its acid reactant. During my experiments I made tests with calcium carbonate, calcium sulphate, magnesium oxide, aluminic oxide, calcium hydroxide, anhydrous neutral sodium sulphate, anhydrous di-sodium phosphate, and magnesium carbonate in varying proportions, with and without the electrostatic treatment. Of these the calcium carbonate was the most successful, and the replacement of the bicarbonate of soda with approximately 15% of its chemical equivalent in electrostatically treated calcium carbonate represented further improvement in the keeping qualities of the baking powder, the same being fixed at about 1114 as compared with 1044 for the electrostatically treated baking powder without the calcium carbonate. I found that 10% was not so effective, and that 20% led to no further improvement.

As a formula which I used successfully I give the following as an illustration for a baking powder.

| | Pounds |
|---|---|
| Granular bicarbonate of soda | 93.0 |
| Pulverulent calcium carbonate | 19.5 |
| Fine monocalcium phosphate | 133.4 |
| Dried corn starch | 154.1 |
| Total | 400.0 |

In this formula there has been a substitution of 15% of the usual amount of bicarbonate of soda by the calculated chemical equivalent of calcium carbonate.

The results attained with the electrically treated calcium carbonate were unexpected as previous experiments of adding powdered calcium carbonate to the standard granular baking powder had showed poorer keeping quality. My records show that the addition of 2.2% of powdered calcium carbonate, without electrostatic treatment, to the standard baking powder caused a decrease in the keeping quality ratio from 1000 to 453.

The use of calcium carbonate as a reaction inhibitor in a baking powder, whether or not electrostatically treated, is novel to the best of my knowledge and belief. My experiments indicate that this material preferably should be in powdered form as the granular form would not react sufficiently fast with the acid ingredient. It would also be insoluble in the batter and would leave a gritty residue. As the use of the powdered form without the electrostatic treatment was unsatisfactory with the granular baking powder, and as baking powders composed entirely of powdered ingredients are unsatisfactory as to keeping qualities, my experiments indicate that the use of a chemical inhibitor of reaction between the alkaline and acid reactants of a baking powder, so far at least as the calcium carbonate is concerned, is in large part dependent on my electrostatic treatment.

In my experiments, in the case of the added calcium carbonate the equivalent carbon dioxide value was deducted from the total quantity of the soda, thus leaving the available carbon dioxide generating material the same as it was in the original formula. In the case of the neutral or inert added ingredients used in my tests above referred to, they were deducted from the starch so that there was no change in the amounts of reactive ingredients. To illustrate this I would note that the formula for a standard baking powder is:

| | Grams |
|---|---|
| Soda | 123.1 |
| Starch | 176.9 |
| Phosphate | 150.0 | making a total of 450 grams. If we reduce this to a percentage basis it will be:

| | Per cent |
|---|---|
| Soda | 27.3 |
| Starch | 39.3 |
| Phosphate | 33.4 |

If we wished to add, in an experiment, 20% of calcium sulphate, for example, we would deduct this from the 39.3% of starch and the formula would read:

| | Per cent |
|---|---|
| Soda | 27.3 |
| Calcium sulphate | 20.0 |
| Starch | 19.3 |
| Phosphate | 33.4 |

All of the mentioned materials were added in powdered form in the search for a material which would have an inhibitive action on the reaction of the soda and the phosphate in combination with the electrostatic condition. While all the materials were cheap enough to be considered practicable, none gave the results which I secured with the calcium carbonate.

My baking powder researches indicated that the electrostatic charge seems to inhibit the chemical reaction of the ingredients but I am unable at this time to offer any exact theory to explain this and do not wish to be limited by any theory in such difficult and delicate matters where proofs are practically impossible and observations at best are difficult. I have accomplished the object of my research and have produced a baking powder containing granular bicarbonate of soda and a fine or pulverulent acid reactant, which has as good or better keeping qualities than the standard commercial granular baking powder where both the alkaline and acid reactants are in granular condition. It is of great advantage to be able to use fine or pulverulent reactants in the baking powder. They dissolve more easily in the batter or dough, are cheaper to make and mix more easily. The manufacturing advantage in powdering or pulverizing the materials instead of granulating the same is also substantial.

If preferred, there is no reason why the soda should not be in the pulverulent condition and the phosphate in granular form. My invention broadly involves the mixture of any two or more reactant materials provided one be in granular form and one in powdered form. In the manufacture of phosphate baking powder, it is more convenient to have the soda in granular form and the phosphate in powdered form, but my invention contemplates the reversed condition if this be preferred.

What I therefore claim and desire to secure by Letters Patent is:—

1. In a baking powder, a pair of reactant factors, one reactant consisting of bicarbonate of soda and a smaller amount of calcium carbonate in intimate admixture in a fine dry diluent body of starch, and the other reactant being monocalcium phosphate admixed with said mixture of said first named reactant and starch, the particles of said reactant factors each having a separate charge of static electricity of like sign whereby to provide mutual repellance between said reactants through the starchy body of the mixture prior to use.

2. In a baking powder, a pair of reactant factors, one reactant consisting of bicarbonate of soda in intimate admixture in a fine dry diluent body of starch, and the other reactant being monocalcium phosphate admixed with said mixture of said first named reactant and starch, the particles of said reactant factors each having a charge of static electricity of like sign whereby to provide mutual repellancy between said reactants through the starchy body of the mixture prior to use.

3. The baking powder of claim 2 in which one reactant factor is in granular form and the other in pulverulent form.

4. The baking powder of claim 2 in which the bicarbonate of soda is in granular form and the calcium carbonate and monocalcium phosphate are in pulverulent form.

5. A baking powder comprising an alkaline reactant and an acid reactant, one of said reactants being in granular form and the other in powdered form, and each having a charge of static electricity of like sign so as to provide a state of mutual repellancy between said reactants throughout the mixture prior to use.

6. The baking powder of claim 5 in which the alkaline reactant comprises bicarbonate of soda and the acid reactant is calcium phosphate.

7. In a method of producing a baking powder of high keeping quality, those steps consisting in separately charging one of the reactants in granular form and another reactant in pulverulent form with an electrostatic charge of like sign to render their respective particles mutually repellant, and in mixing the said charged reactants.

8. In a method of producing a baking powder of high keeping quality, those steps consisting in separately charging one of the reactants in granular form and another reactant in pulverulent form with an electrostatic charge of like sign to render their respective particles mutually repellant, and in dispersing said charged reactants in an inert pulverulent diluent.

9. In a method of producing a baking powder of high keeping quality, those steps consisting in separately charging one of the reactants in granular form and another reactant in pulverulent form with an electrostatic charge of like sign to render their respective particles mutually repellant, in first mixing one of said charged reactants with an inert pulverulent diluent and in adding the other charged reactant to said first mixture and mixing the same therewith.

10. In a method of producing a baking powder of high keeping quality, those steps consisting in separately charging granular bicarbonate of soda and a powdered acid reactant with electricity of the same sign, and in mixing the same.

11. In a method of producing a baking powder of high keeping quality, those steps consisting in separately charging granular bicarbonate of soda, powdered calcium carbonate and a powdered acid reactant with electricity of the same sign, and in mixing the carbonates with a starchy body and in adding the acid reactant thereto and mixing.

AUGUSTUS H. FISKE.